(12) United States Patent
Nishimura

(10) Patent No.: US 8,263,211 B2
(45) Date of Patent: Sep. 11, 2012

(54) INSERT MOLDING LAMINATE AND MANUFACTURING METHOD THEREOF, AND INSERT MOLDING AND MANUFACTURING METHOD THEREOF

(75) Inventor: Takeshi Nishimura, Kyoto (JP)

(73) Assignee: Nissha Printing Co., Ltd., Kyoto (JP)

(*) Notice: Subject to any disclaimer, the term of this patent is extended or adjusted under 35 U.S.C. 154(b) by 388 days.

(21) Appl. No.: 12/600,592

(22) PCT Filed: May 30, 2008

(86) PCT No.: PCT/JP2008/059980
§ 371 (c)(1),
(2), (4) Date: Feb. 25, 2010

(87) PCT Pub. No.: WO2008/149789
PCT Pub. Date: Dec. 11, 2008

(65) Prior Publication Data
US 2010/0159183 A1    Jun. 24, 2010

(30) Foreign Application Priority Data

May 31, 2007  (JP) ................................ 2007-144878

(51) Int. Cl.
*B32B 7/10* (2006.01)
*B32B 7/14* (2006.01)

(52) U.S. Cl. ......... 428/194; 428/203; 428/210; 345/174
(58) Field of Classification Search .................. 428/194, 428/203, 210; 345/174; 156/60; 264/275
See application file for complete search history.

(56) References Cited

FOREIGN PATENT DOCUMENTS

| | | |
|---|---|---|
| JP | 2249616 A | 10/1990 |
| JP | 4-018628 A | 1/1992 |
| JP | 5-47815 U | 6/1993 |
| JP | 5-324203 A | 12/1993 |
| JP | 2005-222266 A | 8/2005 |

*Primary Examiner* — Alexander Thomas
(74) *Attorney, Agent, or Firm* — The Webb Law Firm

(57) ABSTRACT

The invention provides an insert molding laminate providing excellent transparency to a transparent window portion and excellent adhesiveness to both a capacitance-type touch sensor and an injection-molded resin portion, and a manufacturing method thereof, and an insert molding and a manufacturing method thereof. The insert molding laminate comprises a glass substrate, a heat-resisting adhesive layer having a frame shape and formed on peripheral portions of one surface of the glass substrate, a transparent pressure-sensitive adhesive layer formed on an inner side portion of the one surface of the glass substrate and shaped to partially overlap the heat-resisting adhesive layer in a thickness direction of the glass substrate, and a capacitance-type touch sensor laminated on the transparent pressure-sensitive adhesive layer and having a configuration smaller than an outer configuration of the glass substrate.

17 Claims, 4 Drawing Sheets

[Fig 1]
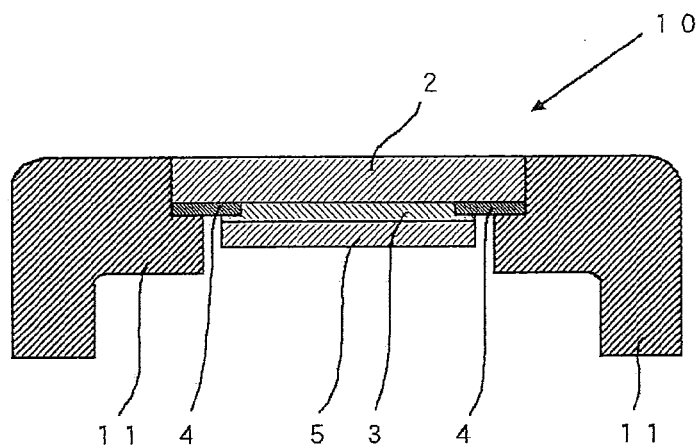
[Fig 2]
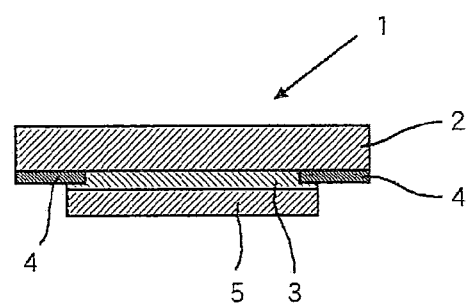
[Fig 3]
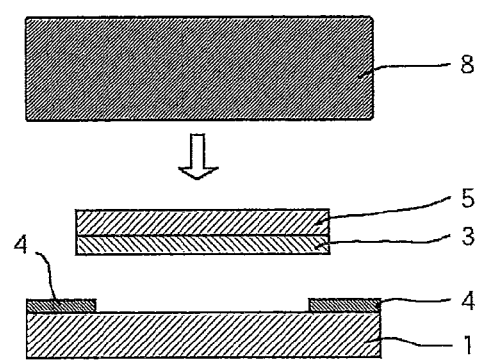
[Fig 4]
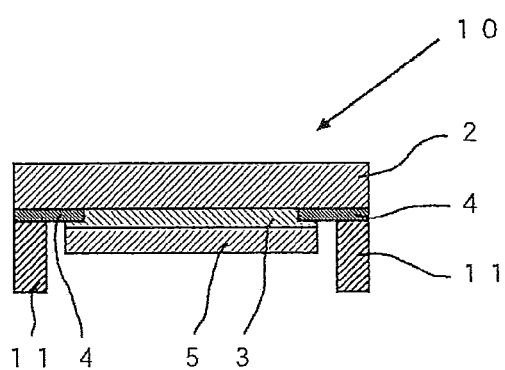

[Fig 5]
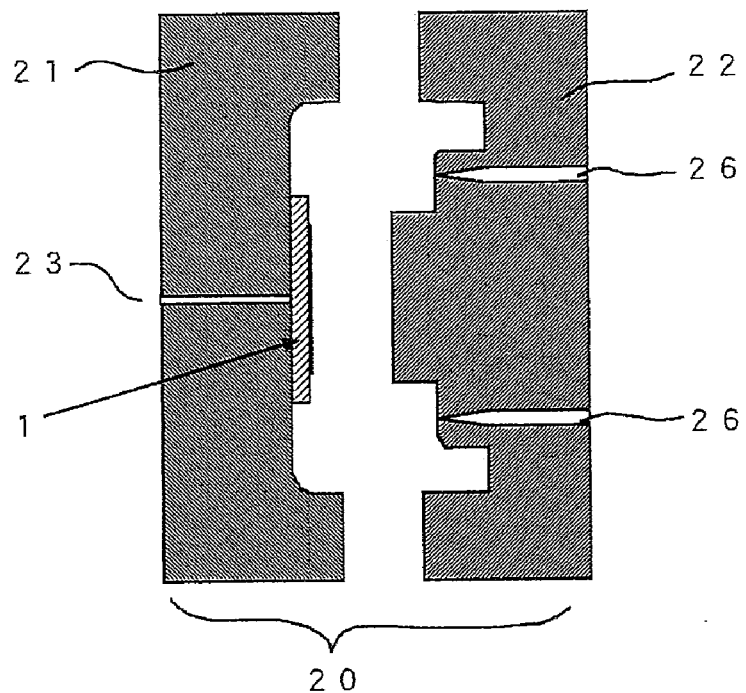
[Fig 6]
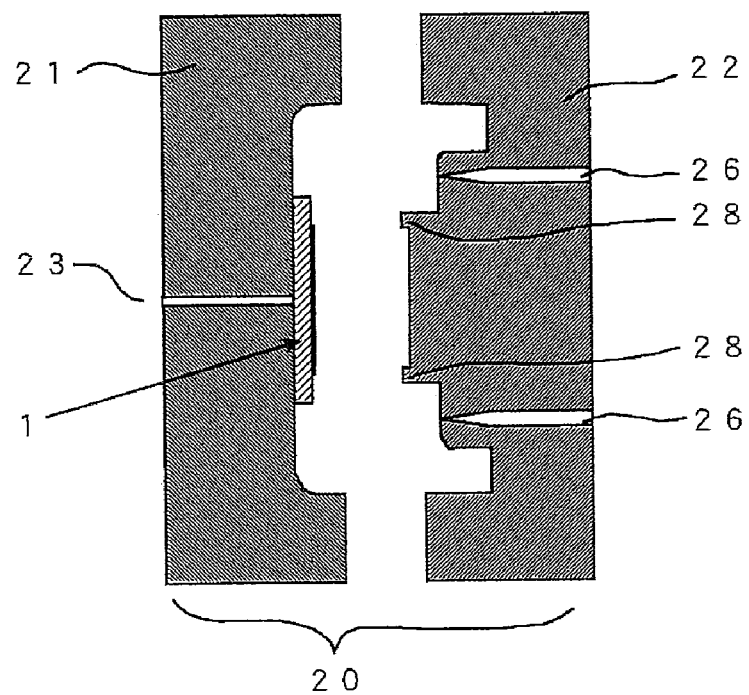

[Fig 7]
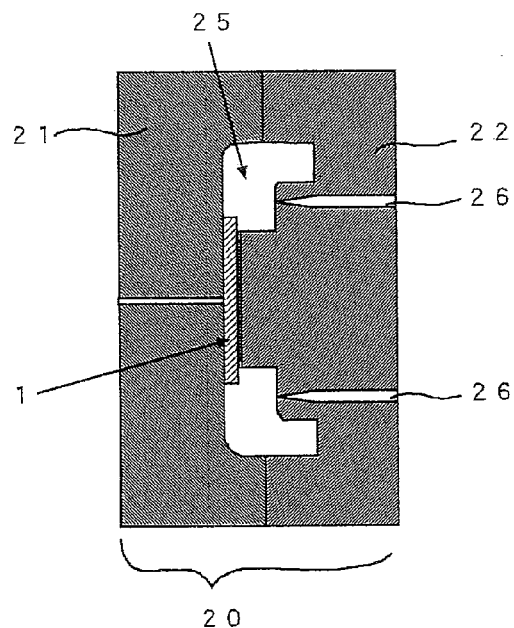
[Fig 8]
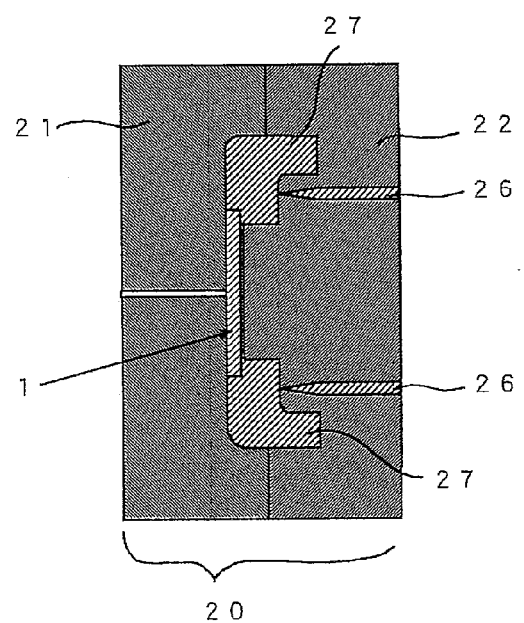
[Fig 9]
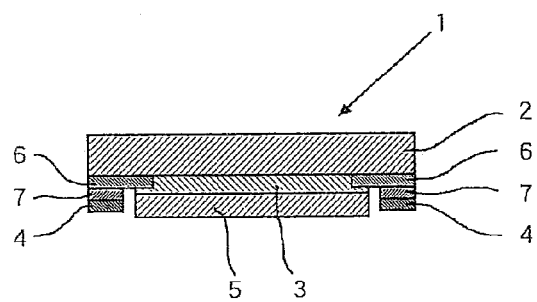

[Fig 10]
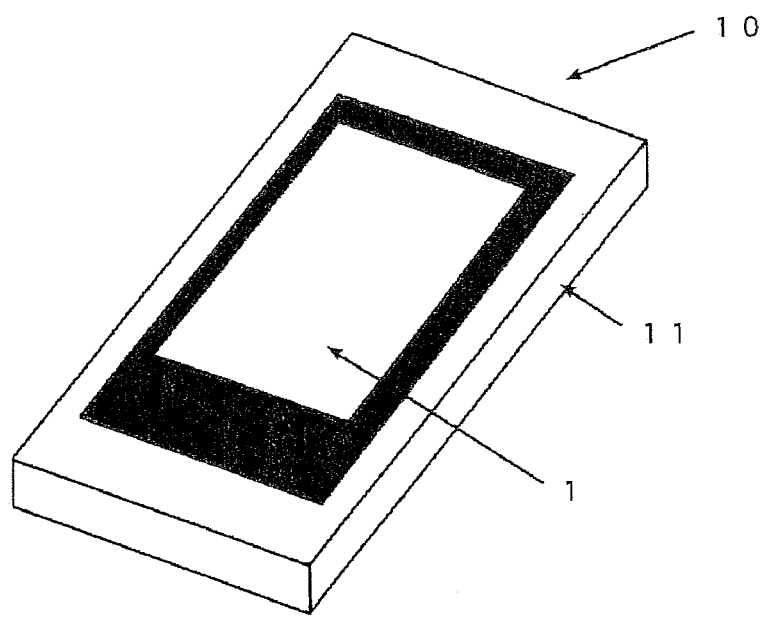
[Fig 11]
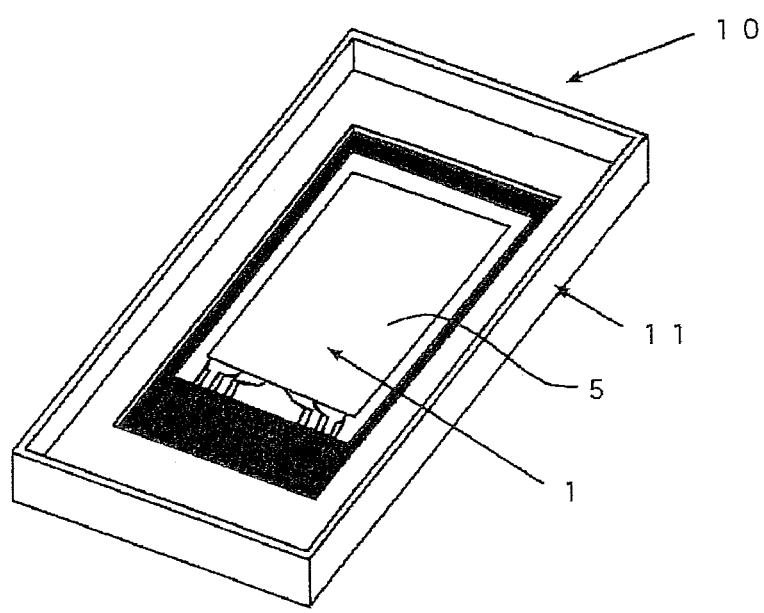

INSERT MOLDING LAMINATE AND MANUFACTURING METHOD THEREOF, AND INSERT MOLDING AND MANUFACTURING METHOD THEREOF

TECHNICAL FIELD

The present invention relates to an insert molding comprising a glass substrate having a central portion serving as a transparent display window, a pattern layer formed on a back side of the display window at peripheries thereof, a capacitance-type touch sensor laminated on a back side of the transparent display window, and an injection-molded resin portion formed integrally with the glass substrate at peripheries thereof.

BACKGROUND ART

The inventor of this application has invented a housing case comprising a flat plate made of a glass substrate with a display window, and a resin frame integrally formed with the flat plate to support peripheral edges of a back side of the flat plate, wherein the glass substrate has decoration at a back side thereof (see Patent Document 1).

With the above-noted housing case, the layer having decoration also serves as an adhesive layer for glass at the portion where the back side of the flat plate is integrally formed with the resin frame so that the back side of the flat plate is integral with the resin frame through an adhesive layer for resin.

[Patent Document 1] Japanese Patent Application No. 2006-294799

DISCLOSURE OF THE INVENTION

Problem to Be Solved by the Invention

In the arrangement where the glass substrate has the transparent display window at the central portion thereof and the capacitance-type touch sensor is provided in the back side of the display window, there has been a drawback that the adhesive for glass has poor adhesiveness against a plastic film, which hampers the capacitance-type touch sensor comprising the plastic film from being firmly attached. A further disadvantage is that the adhesive for glass is unsuitable due to its poor transparency for the transparent display window requiring clearness.

Meanwhile, the inventor of the present application has taken into consideration a material comprising a transparent pressure-sensitive adhesive having excellent transparency and providing good adhesiveness to both the glass and the capacitance-type touch sensor. However, it has been found that the pressure-sensitive adhesive is poor in heat resistance and tends to be foamed due to heat from molten molding resin, and thus cannot be used as the adhesive for the injection molding resin.

The object of the invention is to provide an insert molding laminate for solving the above-noted problems which provides excellent transparency to a transparent window portion and excellent adhesiveness to both a capacitance-type touch sensor and an injection-molded resin portion, and a manufacturing method thereof, and an insert molding and a manufacturing method thereof

Means for Solving the Problem

A first characteristic feature of the present invention lies in an insert molding laminate comprising a glass substrate, a heat-resisting adhesive layer having a frame shape and formed on peripheral portions of one surface of the glass substrate, a transparent pressure-sensitive adhesive layer formed on an inner side portion of the one surface of the glass substrate and shaped to partially overlap the heat-resisting adhesive layer in a thickness direction of the glass substrate, and a capacitance-type touch sensor laminated on the transparent pressure-sensitive adhesive layer and having a configuration smaller than an outer configuration of the glass substrate.

With the insert molding laminate in accordance with the present invention, the heat-resisting adhesive layer that resists heat from the molten injection-molding resin and provides a pattern is formed on the glass substrate of the insert molding laminate, which prevents any foaming from developing due to the heat of the molten injection-molding resin and allows a firmly adhered condition to be maintained.

Further, since the capacitance-type touch sensor is firmly adhered to the glass substrate through the transparent pressure-sensitive adhesive layer, the capacitance-type touch sensor per se can prevent fragments of the glass substrate from scattering if the glass substrate is broken.

A second feature of the present invention lies in the insert molding laminate in which the heat-resisting adhesive layer provides a pattern.

A third feature of the present invention lies in the insert molding laminate comprising a glass substrate, a pattern layer having a frame shape and formed on peripheral portions of one surface of the glass substrate, a primer layer having a frame shape and formed on the pattern layer, a heat-resisting adhesive layer having a frame shape and formed on the primer layer, a transparent pressure-sensitive adhesive layer formed on an inner side portion of the one surface of the glass substrate and shaped to partially overlap the pattern layer in a thickness direction of the glass substrate, and a capacitance-type touch sensor laminated on the transparent pressure-sensitive adhesive layer and having a configuration smaller than an outer configuration of the glass substrate.

A fourth feature of the present invention lies in a method of manufacturing the insert molding laminate comprising the steps of forming a heat-resisting adhesive layer on peripheral portions of one surface of a glass substrate to have a frame shape, forming a transparent pressure-sensitive adhesive layer on one side of a capacitance-type touch sensor having a configuration smaller than an outer configuration of the glass substrate, and adhering the capacitance-type touch sensor to an inner side portion of the one surface of the glass substrate and shaped to partially overlap the heat-resisting adhesive layer in a thickness direction of the glass substrate.

With the method of manufacturing the insert molding laminate in accordance with the present invention, the above-noted insert molding laminate can be easily provided.

A fifth feature of the present invention lies in the method of the insert molding laminate comprising the steps of forming a pattern layer on peripheral portions of one surface of a glass substrate to have a frame shape, forming a primer layer on the pattern layer to have a frame shape, forming a heat-resisting adhesive layer on the primer layer to have a frame shape, forming a transparent pressure-sensitive adhesive layer on one side of a capacitance-type touch sensor having a configuration smaller than an outer configuration of the glass substrate, and adhering the capacitance-type touch sensor to an inner side portion of the one surface of the glass substrate and shaped to partially overlap the pattern layer in a thickness direction of the glass substrate.

A sixth feature of the present invention lines in an insert molding comprising a glass substrate, a heat-resisting adhesive layer having a frame shape and formed on peripheral portions of one surface of the glass substrate, a transparent pressure-sensitive adhesive layer formed on an inner side portion of the one surface of the glass substrate and shaped to partially overlap the heat-resisting adhesive layer in a thickness direction of the glass substrate, a capacitance-type touch sensor laminated on the transparent pressure-sensitive adhesive layer and having a configuration smaller than an outer configuration of the glass substrate, and an injection-molded resin portion formed integrally with a portion of the heat-resisting adhesive layer where the transparent pressure-sensitive adhesive layer is absent to have an opening larger than the outer configuration of the capacitance-type touch sensor.

According to the present invention, the insert molding in which the glass substrate is not removed.

A seventh feature of the present invention lies in the insert molding in which the heat-resisting adhesive layer provides a pattern.

An eighth feature of the present invention lies in the insert molding comprising a glass substrate, a pattern layer having a frame shape and formed on peripheral portions of one surface of the glass substrate, a primer layer having a frame shape and formed on the pattern layer, a heat-resisting adhesive layer having a frame shape and formed on the primer layer, a transparent pressure-sensitive adhesive layer formed on an inner side portion of the one surface of the glass substrate and shaped to partially overlap the pattern layer in a thickness direction of the glass substrate, a capacitance-type touch sensor laminated on the transparent pressure-sensitive adhesive layer and having a configuration smaller than an outer configuration of the glass substrate, and an injection-molded resin portion formed integrally with a portion of the heat-resisting adhesive layer where the transparent pressure-sensitive adhesive layer is absent to have an opening larger than the outer configuration of the capacitance-type touch sensor.

A ninth feature of the present invention lies in the insert molding in which the injection-molded resin portion is made of resin having a mold shrinkage ratio of 0.6% or less.

A tenth feature of the present invention lies in a method of manufacturing the insert molding, comprising the steps of placing the above-noted insert molding laminate on a predetermined position of an injection molding die unit, fastening the injection molding die unit, filling a cavity formed by the injection molding die unit and the insert molding laminate with molten injection-molding resin, cooling and solidifying the injection-molding resin to form an injection-molded resin portion integrally with a portion of the heat-resisting adhesive layer of the insert molding laminate where the transparent pressure-sensitive adhesive layer is absent to have an opening larger than the outer configuration of the capacitance-type touch sensor, and opening the injection molding die unit.

According to the present invention, the above-noted insert molding can be easily provided.

An eleventh feature of the present invention lies in the method of manufacturing the insert molding in which the injection molding die unit includes a cavity surface contacting the capacitance-type touch sensor and having a projection with a shape surrounding outer peripheries of the capacitance-type touch sensor.

BRIEF DESCRIPTION OF THE DRAWINGS

FIG. 1 is a sectional view showing an embodiment of an insert molding in accordance with the present invention;

FIG. 2 is a sectional view showing an embodiment of an insert molding laminate in accordance with the present invention;

FIG. 3 is a sectional view showing a process of a manufacturing method of the insert molding laminate in accordance with the present invention;

FIG. 4 is a sectional view showing an alternative embodiment of the insert molding in accordance with the present invention;

FIG. 5 is a sectional view showing a process of a manufacturing method of the insert molding;

FIG. 6 is a sectional view showing a process of the manufacturing method of the insert molding;

FIG. 7 is a sectional view showing a process of the manufacturing method of the insert molding;

FIG. 8 is a sectional view showing a process of the manufacturing method of the insert molding;

FIG. 9 is a sectional view showing an alternative embodiment of the insert molding laminate in accordance with the present invention;

FIG. 10 is a perspective view showing the embodiment of the insert molding in accordance with the present invention; and FIG. 11 is another perspective view showing he embodiment of the insert molding in accordance with the present invention.

BEST MODE FOR CARRYING OUT THE INVENTION

Embodiments of the present invention will be described in detail hereinafter in reference to the accompanying drawings.

FIG. 1 is a sectional view showing an embodiment of an insert molding in accordance with the present invention. FIG. 2 is a sectional view showing an embodiment of an insert molding laminate in accordance with the present invention. FIG. 3 is a sectional view showing a process of a manufacturing method of the insert molding laminate in accordance with the present invention. FIG. 4 is a sectional view showing an alternative embodiment of the insert molding in accordance with the present invention. FIGS. 5 to 8 are sectional views each showing a process of a manufacturing method of the insert molding. FIG. 9 is a sectional view showing an alternative embodiment of the insert molding laminate in accordance with the present invention. FIGS. 10 and 11 are perspective views each showing the embodiment of the insert molding in accordance with the present invention. In the drawings, numeral 1 denotes the insert molding laminate, numeral 2 denotes a glass substrate, numeral 3 denotes a transparent pressure-sensitive adhesive layer, numeral 4 denotes a heat-resisting adhesive layer, numeral 5 denotes a capacitance-type touch sensor, numeral 6 denotes a pattern layer, numeral 7 denotes a primer layer, numeral 8 denotes a pressing pad, numeral 10 denotes the insert molding, numeral 11 denotes an injection-molded resin portion, numeral 20 denotes an insert molding die unit, numeral 21 denotes a fixed die, numeral 22 denotes a movable die, numeral 23 denotes a suction aperture, numeral 24 denotes air, numeral 25 denotes a cavity, numeral 26 denotes a gate, numeral 27 denotes molten resin, and numeral 28 denotes a projection. It should be noted that the like reference numbers are assigned to the like elements in the drawings.

The insert molding laminate 1 in accordance with a first embodiment of the present invention comprises a heat-resisting adhesive layer 4 having a frame shape and formed on peripheral portions of one surface of the glass substrate 2, a transparent pressure-sensitive adhesive layer 3 formed on an inner side portion of the one surface of the glass substrate 2 and shaped to partially overlap the heat-resisting adhesive layer 4 in a thickness direction of the glass substrate 2, and a capacitance-type touch sensor 5 laminated on the transparent pressure-sensitive adhesive layer 3 and having a configuration smaller than an outer configuration of the glass substrate 2 (see FIG. 1).

As the glass substrate 2, a regular glass plate, a reinforcement glass plate or a polished glass plate, each of which has a rectangular shape with sufficient hardness (7H or above), may be used. The glass plate preferably has a thickness of 0.3 mm to 2.0 mm, and more preferably 0.5 mm to 2.0 mm in terms of the strength.

The heat-resisting adhesive layer 4 is formed on the peripheral portions of the one surface of the glass substrate 2 to have the frame shape, and the transparent pressure-sensitive adhesive layer 3 is formed to cover a region acting as a transparent window defined within the frame of the heat-resisting adhesive layer 4 and overlap part of the heat-resisting adhesive layer 4 (see FIG. 1). Since the heat-resisting adhesive layer 4 and the transparent pressure-sensitive adhesive layer 3 are formed in this manner, there is no gap formed between the heat-resisting adhesive layer 4 and the transparent pressure-sensitive adhesive layer 3 on the glass substrate 2, though they are overlapped in part. Thus, the capacitance-type touch sensor 5 is easily arranged to occupy the entire window area of the glass substrate 2 surrounded by the heat-resisting adhesive layer 4 when applied on the transparent pressure-sensitive adhesive layer 3.

The heat-resisting adhesive layer 4 functions to adhere the glass substrate 2 to the injection-molded resin portion 11, being made mainly of a silane coupling agent, or other various kinds of resins including an amid series, an acetal series, a cellulose series, an alkyd series, a vinyl series, an acryl series, a urethane series, a polyester series and an epoxy series, for example, or their mixtures. Above all, polyester resin is most preferable in terms of coating properties, heat resistance and adhesiveness. It is further preferable to select a thermoplastic resin material among them that has the Vicat softening temperature of 60° C. or above because, if the softening temperature is lower, molten injection-molding resin reaches a boundary between the glass substrate 2 and the heat-resisting adhesive layer 4 to eliminate the heat-resisting adhesive layer 4 even if the layer thickness is increased. It should be noted that the heat-resisting adhesive layer 4 may be a colored ink layer to be decorative containing a pigment or a dye of a desired color as a coloring agent using the above-noted resin as a binder. Instead, only part of the heat-resisting adhesive layer 4 may be the colored ink layer. The heat-resisting adhesive layer 4 can also serve as the frame-shaped pattern layer by being colored.

The heat-resisting adhesive layer 4 has a thickness of preferably 0.5 μm to 30 μm, and more preferably, 2 μm to 30 μm in terms of adhesive strength. This is because considerable heat and pressure of molten injection-molding resin are applied when the glass substrate 2 is adhered to the injection-molded resin portion 11 and thus the molten injection-molding resin reaches the boundary between the glass substrate 2 and the heat-resisting adhesive layer 4 to eliminate the heat-resisting adhesive layer 4 if the heat-resisting adhesive layer 4 is thin.

The heat-resisting adhesive layer 4 may be formed by general-purpose printing techniques such as a screen printing method or coating techniques such as a spray coating method. Instead, other techniques such as an ink-jet printing method may be employed.

The heat-resisting adhesive layer 4 may also comprises a plurality of layers combined with a metal thin layer, instead of the simple resin layer or the colored ink layer. The metal thin layer serves to provide metal luster as a decorative layer and is formed by vacuum evaporation techniques, sputtering techniques, ion plating techniques, or plating techniques, for example. Here, metal such as aluminum, nickel, gold, platinum, chrome, iron, copper, tin, indium, silver, titanium, lead and zinc, or their alloys or compounds may be used depending on the desired metallic luster. When the metal thin layer is partly formed, a method may be used for forming a solvent-soluble resin layer on a portion where the metal thin layer does not need to be formed first and then forming the thin metal layer over the entire region thereon, and performing solvent washing to remove the unwanted metal thin layer together with the solvent-soluble resin layer. Instead, another method may be used for forming the metal thin layer on the entire surface, forming a resist layer on a portion where the metal thin layer should remain, and removing the resist layer by performing etching with acid or alkali.

In case the adhesiveness between the heat-resisting adhesive layer 4 and the injection-molded resin portion 11 are decreased when the heat-resisting adhesive layer 4 is formed as the colored ink layer or the metal thin layer, a three-layered structure may be employed in which the colored layer or the metal thin layer serves as the pattern layer 6 and the heat-resisting adhesive layer 4 having good adhesiveness relative to the injection-molded resin portion 11 is formed separately vie the primer layer 7 (see FIG. 9). In this case, the primer layer 7 and the heat-resisting adhesive layer 4 are laminated like a frame of the pattern layer 6 that is also formed as the frame of the glass substrate. Due to such an arrangement, the transparent pressure-sensitive adhesive layer 3 can be formed to be smaller than the inner dimension of the heat-resisting adhesive layer 4 and partly overlap the pattern layer 6 only, as a result which the capacitance-type touch sensor 5 is easily arranged to occupy the entire window area of the glass substrate 2 surrounded by the pattern layer 6. In addition, this structure allows the transparent pressure-sensitive adhesive layer 3 to be juxtaposed to the heat-resisting adhesive layer 4, which prevents heat pressure applied to the heat-resisting adhesive layer 4 in time of injection molding from being transmitted to the transparent pressure-sensitive adhesive layer 3. As a result, the adhesive performance of the transparent pressure-sensitive adhesive layer 3 does not decline at all.

The primer layer 7 may be formed by the above-noted general-purpose printing techniques, for example, using the resin including amid resin, acetal resin, cellulose resin, alkyd resin, vinyl resin, acryl resin, urethane resin, polyester resin and epoxy resin, etc.

In addition, a further layer may be formed on the glass substrate 2 for enhancing the adhesiveness between the glass substrate 2 and the transparent pressure-sensitive adhesive layer 3 or between the glass substrate 2 and the pattern layer 6. Such a further layer may be formed by the above-noted general-purpose printing techniques, for example, using the silane coupling agent or other material made of the resin including amid resin, acetal resin, cellulose resin, alkyd resin, vinyl resin, acryl resin, urethane resin, polyester resin and epoxy resin, for example.

The transparent pressure-sensitive adhesive layer 3 acts as the adhesive layer for providing the adhesiveness (viscosity) to the glass substrate 2 and to the capacitance-type touch sensor 5 when pressure is applied. The transparent pressure-sensitive adhesive layer 3 is preferably made of a material having transparency with light transmittance of 90% or above when measured with the transparent pressure-sensitive adhesive layer being provided on the glass substrate 2. In that sense, acryl resin is most preferable. The transparent pressure-sensitive adhesive layer 3 has a thickness of preferably 0.5 μm to 100 μm, and more preferably 10 μm to 100 μm in order to provide a cushion effect by increasing the thickness of the transparent pressure-sensitive adhesive layer 3 to prevent the glass substrate 2 and the capacitance-type touch sensor 5 from being damaged when pressure applied in attaching the transparent pressure-sensitive adhesive layer becomes excessive.

As the transparent pressure-sensitive adhesive layer 3, in addition to acrylic resin, rosin or hydrogenated rosin resin, carbon hydride or hydrogenated carbon hydride resin, phenol resin, terpene resin, terpene phenol resin, styrene terpene resin, hydrogenated terpene resin, polyester resen, pure monomer aromatic resin or hydrogen derivative, or their mixtures may be used. Further, the transparent pressure-sensitive adhesive layer 3 preferably contains a plasticizer such as naphthenic oil, paraffin oil, citrate, sulfonate or phthalate, or their mixtures.

The transparent pressure-sensitive adhesive layer 3 may be formed directly on the capacitance-type touch sensor 5 using the general-purpose screen printing techniques such as the screen printing method, or may be formed on a removable sheet to be attached to the capacitance-type touch sensor 5, from which the removable sheet is removed.

An example of the capacitance-type touch sensor 5 comprises a polyester film having one surface with a pattern of a transparent conductive film made of indium tin oxide, in which the transparent pressure-sensitive adhesive layer 3 is formed on the other surface of the polyester film facing away from the surface having the transparent conductive film formed thereon. A plurality of transparent conductive films may be laminated with the resist layer between them depending on the use, in which a silver paste or a conductive polymer acting as a circuit for taking out an input signal to the outside is applied to peripheries of the transparent conductive film.

As a method of adhering the capacitance-type touch sensor 5 having the transparent pressure-sensitive adhesive layer 3 formed thereon to the glass substrate 2, a pressing silicon pad is pressed against the substrate under pressure of 0.1 kg/cm$^2$ to 100 kg/cm$^2$, for example (see FIG. 2).

The transparent pressure-sensitive adhesive layer 3 may be first provided in the glass substrate 2, to which the capacitance-type touch sensor 5 s attached, instead of being formed on the capacitance-type touch sensor 5 first.

Next, a method of manufacturing the insert molding 10 using the insert molding laminate 1 formed as above (see FIGS. 5 to 8).

First, the insert molding laminate 1 is placed in a predetermined position of the insert molding die unit 20. Then, air 24 is drawn from the suction aperture 23 formed in the fixed die 21 of the insert molding die unit 20 with the insert molding laminate being positioned there, thereby drawing and fixing the insert molding laminate 1 to the fixed die 21 of the insert molding die unit 20 (see FIG. 5).

Further, as the insert molding die unit 20, the projection 28 may be provided in a cavity surface of the injection molding die contacting the capacitance-type touch sensor 5 of the insert molding laminate 1. The projection 28 has a shape surrounding the outer peripheries of the capacitance-type touch sensor 5 (see FIG. 6). Such a construction having the projection 28 allows the outer peripheries of the capacitance-type touch sensor 5 to be out of contact with the molten resin 27 in the following injection process, which easily prevents the transparent pressure-sensitive adhesive layer 3 used in adhering the capacitance-type touch sensor 5 from being foamed due to the heat of the molten resin 27 and from being separated due to such foaming. In addition, it becomes easy to prevent any damage on a wiring portion formed on the outer peripheral region of the capacitance-type touch sensor 5.

Moreover, since the space into which the molten resin 27 is injected is sealed between the die unit and the glass substrate 2, the pressure kept in the injection molding process is maintained, which causes the disadvantage less often that the capacitance-type touch sensor 5 is pressed by the molten resin 27 to be deformed.

Next, the movable die 22 of the insert molding die unit 20 is moved forward toward the fixed die 21 having the insert molding laminate 1 drawn thereto to be fastened to each other. As a result, the insert molding laminate 1 is held between the movable die 22 and the fixed die 21 to form the cavity 25 defining a die space by the fixed die 21, the movable die 22 and the insert molding laminate 1 (see FIG. 7).

Then, the molten resin 27 injected from the gates 26 fills in the cavity 25 thereby providing the insert molding 10 having the injection-molded resin portion 11 formed on the heat-resisting adhesive layer 4 of the insert molding laminate 1 (see FIGS. 8, 10, 11).

As a material for the injection-molded resin portion 11, general-purpose resin such as polystyrene resin, polyolefin resin, acrylonitrile-butadiene-styrene resin, acrylonitrile-styrene resin or acrylonitrile resin may be used. Further, it is possible to use general-purpose engineering resin such as polyphenylene-oxido-polystyrene resin, polycarbonate resin, polyacetal resin, polyacrylic resin, polycarbonate modified polyphenylene-ether resin, polybutylene-terephthalate resin and super-high-molecular-weight polyethylene resin, or super-engineering resin such as polysulphone resin, polyphenylene-sulfide resin, polyphenylene-oxide resin, polyarylate rein, polyetherimide resin, polyimide resin, liquid crystal polyester resin and polyallyl heat-resistant resin. It also should be noted that the injection-molded resin may be colored or may not be colored.

Further, a mold shrinkage ratio of the resin forming the injection-molded resin portion is preferably 0.6% or less. With the mold shrinkage ratio being within this range, it is possible to prevent the insert molding from warping or prevent a gap from being produced between the glass substrate 2 and the injection-molded resin portion 11 due to the resin shrinkage occurring after the insert molding process is performed. When the injection-molded resin flows into the cavity and the die unit is opened to take out the molded article after the cooling process, the molded article generally has a dimension smaller than that of the cavity due to the shrinkage of the resin. In the present invention, the mold shrinkage ratio represents a difference in dimension between a sample piece and the cavity of the die unit that has molded the sample (JIS K7152-4). More particularly, it is calculated based on a formula: mold shrinkage ratio (%)=(dimension of molding die−dimension of molded article)/dimension of molding die)*100.

In the insert molding 10, the injection-molded resin portion 11 is formed integrally with a portion of the heat-resisting adhesive layer 4 where the transparent pressure-sensitive adhesive layer 3 is absent to have an opening larger than the outer configuration of the capacitance-type touch sensor 5. Such an arrangement of the injection-molded resin portion 11 prevents the injection-molded resin portion 11 from being formed on the transparent pressure-sensitive adhesive layer 3, as a result of which the transparent pressure-sensitive adhesive layer 3 is not foamed due to the thermal pressure applied in the injection molding process to prevent the adhesiveness between the glass substrate 2 and the capacitance-type touch sensor 5 from declining.

In addition, as shown in FIG. 4, the injection-molded resin portion 11 may be formed in the side surfaces of the glass substrate 2 as well to provide a three-dimensional molded article. The glass substrate 2 is fixed more firmly as the injection-molded resin portion 11 is formed in the side surfaces of the glass substrate 2. Moreover, the structure in which the surface of the glass substrate 2 and the surface of the injection-molded resin portion are arranged on the same plane provides the insert molding with an aesthetic appearance in design having no steps or difference in level.

Embodiment

[Embodiment 1]

The heat-resisting adhesive layer was formed on the glass substrate having a length of 38 mm, a width of 58 mm and a thickness of 1 mm by the screen printing method using the polyester resin as the binder and the ink containing a black coloring agent. The heat-resisting adhesive layer provided a pattern with a total thickness of 15 µm and had a frame shape having a width of 5 mm longitudinally and transversely measured from outer edges of the glass substrate.

Next, the transparent pressure-sensitive adhesive layer was formed by the screen printing method using the pressure-sensitive adhesive made of acrylic resin to cover the entire window of the glass substrate surrounded by the heat-resisting adhesive layer having a length of 28 mm and a width of 48 mm and part of the heat-resisting adhesive layer (with a width of 1 mm on average). The transparent pressure-sensitive adhesive layer was provided with a plane pattern having a length of 30 mm, a width of 50 mm and a thickness of 10 µm.

Next, the capacitance-type touch sensor having a length of 29.5 mm and a width of 49.5 mm was placed to cover the entire window of the glass substrate surrounded by the heat-resisting adhesive layer having a length of 28 mm and a width of 48 mm. The silicone rubber pad was pressed under pressure of 1.5 kg/cm² to adhere the transparent pressure-sensitive adhesive layer to the capacitance-type touch sensor to provide the insert molding laminate.

The insert molding laminate provided in this manner had the pattern with a good design formed around the display window of the glass substrate and the capacitance-type touch sensor firmly adhered to the back surface of the display window of the glass substrate to occupy the entire display window. In addition, the central display window had excellent transparency and clearness.

Then, the obtained insert molding laminate as noted above was drawn and fixed to a predetermined position of the fixed die of the insert molding die unit. The movable die was moved forward to fasten the die unit to form the cavity that was filled with the molten injection-molding resin made of acrylic resin with the mold shrinkage ratio of 0.5%. The die unit was opened after cooling and solidifying the resin to provide the insert molding having the injection-molded resin portion formed on the heat-resisting adhesive layer of the insert molding laminate.

The insert molding obtained as noted above provided good adhesiveness between the heat-resisting adhesive layer and the injection-molded resin portion and was free from occurrence of foams in the heat-resisting adhesive layer due to the heat of the molded resin. The insert molding further had the capacitance-type touch sensor firmly adhered to the back surface of the entire window of the glass substrate and provided a three-dimensions shape having the pattern with a good design formed around the window portion of the glass substrate. This insert molding was also excellent in that, even if it is dropped and the surface glass substrate is broken, fewer broken pieces of the glass substrate were scattered.

[Embodiment 2]

The pattern layer was formed on the glass substrate having a length of 38 mm, a width of 58 mm and a thickness of 1 mm. The pattern layer is made of an evaporated film having a thickness of 600 Å and had a frame shape having a width of 5 mm longitudinally and transversely measured from the outer edges of the glass substrate. Next, the primer layer made of polyester resin and the heat-resisting adhesive layer made of vinyl resin were successively laminated on the pattern layer made of the polyester coloring ink containing the black and white coloring agents to have a frame shape having a width of 5 mm longitudinally and transversely measured from the outer edges of the glass substrate.

Next, a sheet having the pressure-sensitive adhesive agent formed on the removable sheet (PSA for glass: 5FTN39 manufactured by Elleair Texcel Co., Ltd.) was applied on the capacitance-type touch sensor having a length of 29.5 mm and a width of 49.5 mm. Then, the removable sheet was removed thereby to form the transparent pressure-sensitive adhesive layer on the entire surface of the capacitance-type touch sensor.

Then, the capacitance-type touch sensor was placed to cover the entire window of the glass substrate surrounded by the pattern layer having a length of 28 mm and a width of 48 mm and part of the pattern layer (with a width of 1 mm on average). The silicone rubber pad was pressed under pressure of 1 kg/cm² to adhere the transparent pressure-sensitive adhesive layer to the glass substrate to provide the insert molding laminate.

The insert molding laminate provided in this manner had the pattern with a good design fanned around the display window of the glass substrate and the capacitance-type touch sensor firmly adhered to the back surface of the display window of the glass substrate to occupy the entire display window. In addition, the central display window had excellent transparency and clearness.

Next, the insert molding laminate was drawn and fixed to a predetermined position of the fixed die of the insert molding die unit. The movable die was moved forward to fasten the die unit to form the cavity that was filled with the molten injection-molding resin made of acrylic resin with the mold shrinkage ratio of 0.5%. The die unit was opened after cooling and solidifying the resin to provide the insert molding having the injection-molded resin portion formed on the heat-resisting adhesive layer of the insert molding laminate.

The insert molding obtained as noted above provided good adhesiveness between the heat-resisting adhesive layer and the injection-molded resin portion and was free from occurrence of foams in the heat-resisting adhesive layer due to the heat of the molded resin. The insert molding further had the capacitance-type touch sensor firmly adhered to the back surface of the entire window of the glass substrate and provided a three-dimensions shape having the pattern with a good design formed around the window portion of the glass substrate. This insert molding was also excellent in that, even if it is dropped and the surface glass substrate is broken, fewer broken pieces of the glass substrate was scattered.

Industrial Utility

The present invention is preferably applicable to communication equipment such as a mobile phone, information equipment installed in the interior of automobiles or home electrical appliances, and thus useful in the industries.

The invention claimed is:

1. An insert molding laminate comprising:
   a glass substrate;
   a heat-resisting adhesive layer having a frame shape and formed on peripheral portions of one surface of the glass substrate;
   a transparent pressure-sensitive adhesive layer formed on an inner side portion of the one surface of the glass substrate and shaped to partially overlap the heat-resisting adhesive layer in a thickness direction of the glass substrate; and a capacitive touch sensor laminated on the transparent pressure-sensitive adhesive layer and having a configuration smaller than an outer configuration of the glass substrate.

2. The insert molding laminate as claimed in claim 1, wherein the heat-resisting adhesive layer provides a pattern.

3. A method of manufacturing an insert molding, comprising the steps of:
placing the insert molding laminate as claimed in claim 2 on a predetermined position of an injection molding die unit;
fastening the injection molding die unit;
filling a cavity formed by the injection molding die unit and the insert molding laminate with molten injection-molding resin;
cooling and solidifying the injection-molding resin to form an injection-molded resin portion integrally with a portion of the heat-resisting adhesive layer of the insert molding laminate where the transparent pressure-sensitive adhesive layer is absent to have an opening larger than the outer configuration of the capacitive touch sensor; and
opening the injection molding die unit.

4. The method of manufacturing the insert molding as claimed in claim 3, wherein the injection molding die unit includes a cavity surface contacting the capacitive touch sensor and having a projection with a shape surrounding outer peripheries of the capacitive touch sensor.

5. An insert molding laminate comprising:
a glass substrate;
a pattern layer having a frame shape and formed on peripheral portions of one surface of the glass substrate;
a primer layer having a frame shape and formed on the pattern layer;
a heat-resisting adhesive layer having a frame shape and formed on the primer layer;
a transparent pressure-sensitive adhesive layer formed on an inner side portion of the one surface of the glass substrate and shaped to partially overlap the pattern layer in a thickness direction of the glass substrate; and
a capacitive touch sensor laminated on the transparent pressure-sensitive adhesive layer and having a configuration smaller than an outer configuration of the glass substrate.

6. A method of manufacturing an insert molding, comprising the steps of:
placing the insert molding laminate as claimed in claim 5 on a predetermined position of an injection molding die unit;
fastening the injection molding die unit;
filling a cavity formed by the injection molding die unit and the insert molding laminate with molten injection-molding resin;
cooling and solidifying the injection-molding resin to form an injection-molded resin portion integrally with a portion of the heat-resisting adhesive layer of the insert molding laminate where the transparent pressure-sensitive adhesive layer is absent to have an opening larger than the outer configuration of the capacitive touch sensor; and
opening the injection molding die unit.

7. The method of manufacturing the insert molding as claimed in claim 6, wherein the injection molding die unit includes a cavity surface contacting the capacitive touch sensor and having a projection with a shape surrounding outer peripheries of the capacitive touch sensor.

8. A method of manufacturing an insert molding laminate, comprising the steps of:
forming a heat-resisting adhesive layer on peripheral portions of one surface of a glass substrate to have a frame shape;
forming a transparent pressure-sensitive adhesive layer on one side of a capacitive touch sensor having a configuration smaller than an outer configuration of the glass substrate; and
adhering the capacitive touch sensor to an inner side portion of the one surface of the glass substrate and shaped to partially overlap the heat-resisting adhesive layer in a thickness direction of the glass substrate.

9. A method of manufacturing an insert molding laminate, comprising the steps of:
forming a pattern layer on peripheral portions of one surface of a glass substrate to have a frame shape;
forming a primer layer on the pattern layer to have a frame shape;
forming a heat-resisting adhesive layer on the primer layer to have a frame shape;
forming a transparent pressure-sensitive adhesive layer on one side of a capacitive touch sensor having a configuration smaller than an outer configuration of the glass substrate; and
adhering the capacitive touch sensor to an inner side portion of the one surface of the glass substrate and shaped to partially overlap the pattern layer in a thickness direction of the glass substrate.

10. An insert molding comprising:
a glass substrate;
a heat-resisting adhesive layer having a frame shape and formed on peripheral portions of one surface of the glass substrate;
a transparent pressure-sensitive adhesive layer formed on an inner side portion of the one surface of the glass substrate and shaped to partially overlap the heat-resisting adhesive layer in a thickness direction of the glass substrate;
a capacitive touch sensor laminated on the transparent pressure-sensitive adhesive layer and having a configuration smaller than an outer configuration of the glass substrate; and
an injection-molded resin portion formed integrally with a portion of the heat-resisting adhesive layer where the transparent pressure-sensitive adhesive layer is absent to have an opening larger than the outer configuration of the capacitive touch sensor.

11. The insert molding as claimed in claim 10, wherein the heat-resisting adhesive layer provides a pattern.

12. The insert molding as claimed in claim 11, wherein the injection-molded resin portion is made of resin having a mold shrinkage ratio of 0.6% or less.

13. An insert molding comprising:
a glass substrate;
a pattern layer having a frame shape and formed on peripheral portions of one surface of the glass substrate;
a primer layer having a frame shape and formed on the pattern layer;
a heat-resisting adhesive layer having a frame shape and formed on the primer layer;
a transparent pressure-sensitive adhesive layer formed on an inner side portion of the one surface of the glass substrate and shaped to partially overlap the pattern layer in a thickness direction of the glass substrate;

a capacitive touch sensor laminated on the transparent pressure-sensitive adhesive layer and having a configuration smaller than an outer configuration of the glass substrate; and an injection-molded resin portion formed integrally with a portion of the heat-resisting adhesive layer where the transparent pressure-sensitive adhesive layer is absent to have an opening larger than the outer configuration of the capacitive touch sensor.

14. The insert molding as claimed in claim 10, wherein the injection-molded resin portion is made of resin having a mold shrinkage ratio of 0.6% or less.

15. The insert molding as claimed in claim 13, wherein the injection-molded resin portion is made of resin having a mold shrinkage ratio of 0.6% or less.

16. A method of manufacturing an insert molding, comprising the steps of:

placing the insert molding laminate as claimed in claim 1 on a predetermined position of an injection molding die unit;

fastening the injection molding die unit;

filling a cavity formed by the injection molding die unit and the insert molding laminate with molten injection-molding resin;

cooling and solidifying the injection-molding resin to form an injection-molded resin portion integrally with a portion of the heat-resisting adhesive layer of the insert molding laminate where the transparent pressure-sensitive adhesive layer is absent to have an opening larger than the outer configuration of the capacitive touch sensor; and opening the injection molding die unit.

17. The method of manufacturing the insert molding as claimed in claim 16, wherein the injection molding die unit includes a cavity surface contacting the capacitive touch sensor and having a projection with a shape surrounding outer peripheries of the capacitive touch sensor.

* * * * *